(12) United States Patent
Addiego et al.

(10) Patent No.: US 7,988,804 B2
(45) Date of Patent: Aug. 2, 2011

(54) MATERIAL AND METHOD FOR BONDING ZIRCON BLOCKS

(75) Inventors: William Peter Addiego, Big Flats, NY (US); Christopher Raymond Glose, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/390,799

(22) Filed: Feb. 23, 2009

(65) Prior Publication Data

US 2009/0272482 A1    Nov. 5, 2009

Related U.S. Application Data

(60) Provisional application No. 61/126,267, filed on May 2, 2008.

(51) Int. Cl.
  C04B 33/34      (2006.01)
  C03B 29/00      (2006.01)
  C09K 3/00       (2006.01)
(52) U.S. Cl. .................. 156/89.28; 156/89.11; 252/193
(58) Field of Classification Search ............... 156/89.11, 156/89.12
  See application file for complete search history.

(56) References Cited

U.S. PATENT DOCUMENTS

| | | | |
|---|---|---|---|
| 4,152,166 A * | 5/1979 | Rogers | 501/87 |
| 5,238,518 A * | 8/1993 | Okubi et al. | 156/326 |
| 6,121,177 A * | 9/2000 | Guigonis et al. | 501/105 |
| 2003/0121287 A1 | 7/2003 | Chalk et al. | 65/90 |
| 2004/0055338 A1 * | 3/2004 | Helfinstine et al. | 65/374.13 |
| 2005/0130830 A1 | 6/2005 | Ames et al. | 501/103 |
| 2006/0151582 A1 * | 7/2006 | Goretta et al. | 228/248.1 |
| 2006/0225833 A1 * | 10/2006 | Fujita et al. | 156/267 |
| 2008/0139377 A1 | 6/2008 | Helfinstine et al. | 501/106 |

FOREIGN PATENT DOCUMENTS

| | | |
|---|---|---|
| DE | 4042681 | 1/2002 |
| GB | 2303375 | 2/1997 |
| JP | 11-092245 | 4/1999 |
| JP | 2005134198 A * | 5/2005 |
| JP | 17-200295 | 7/2005 |
| WO | WO2009/054951 | 4/2009 |
| WO | WO2009/058345 | 5/2009 |

OTHER PUBLICATIONS

Shi et al., "Synthesis and Characterization of Ultrafine Zircon Powder", Ceramics International 24 (1998) pp. 393-400.
Valero et al., "Hydrothermal Synthesis of Porous Zircon in Basic Fluorinated Medium", Microporous and Mesopurous Materials 29 (1999) pp. 311-318.
Veytizou et al., "Preparation of Zircon Bodies From Amorphous Precursor Powder Synthesized by Sol-Gel Processing", J. of the European Ceramic Society 22 (2002) pp. 2901-2909.

* cited by examiner

*Primary Examiner* — Philip C Tucker
*Assistant Examiner* — Alex Efta
(74) *Attorney, Agent, or Firm* — Siwen Chen

(57) ABSTRACT

A process for making large zircon blocks by bonding multiple zircon components, and bonding materials for use in such process. The invention enables the manufacture of large zircon blocks without the need of larger-size isopressing equipment. The invention is particularly useful in making large-size isopipes for use in a fusion down-draw process in making glass sheets for use in, e.g., LCD production.

11 Claims, 1 Drawing Sheet

MATERIAL AND METHOD FOR BONDING ZIRCON BLOCKS

CROSS-REFERENCE TO RELATED APPLICATION

The present application claims priority to U.S. Provisional Patent Application Ser. No. 61/126,267, filed on May 2, 2008 and entitled "MATERIAL AND METHOD FOR WELDING ZIRCON BLOCKS," the content of which is relied upon and incorporated herein by reference in its entirety.

TECHNICAL FIELD

The present invention relates to materials and methods for forming zircon blocks. In particular, the present invention relates to materials and methods for bonding zircon blocks to form larger-size zircon blocks. The present invention is useful, e.g., in making large-size isopipe for fusion down-draw processes in the manufacture of glass sheets.

BACKGROUND

A leading process for making high-quality glass substrates with pristine surface quality for LCD displays is the fusion down-draw process. The forming device in a fusion down-draw process, typically called an isopipe, is illustrated in FIG. 1. The isopipe 100 illustrated in this Figure comprises a trough 103 and a wedge 107. Glass melt is introduced into the trough through an inlet tube 101. A stream of glass melt is allowed to flow over each side of the trough, down on both sides of the trough and wedge. The two glass streams join at the bottom of the wedge 109, where they fuse together to form a single glass sheet 111 having two pristine surfaces that have not been exposed to the isopipe surface during forming. In a typical method to make the isopipe, zircon is isostatically pressed in a machine called isopress into a larger block (called "green body") and then fired at a high temperature, such as over 1500° C. During firing, zircon crystal grains grow and pack, transforming the green body into a dense ceramic body. Significant shrinkage of the green body is typically observed during firing. The fired, dense ceramic block having a relatively stable structure and density under normal operating conditions of the isopipe is then cut into the shape and size for an isopipe.

The size of LCD glass substrates used by LCD panel makers has increased steadily over the years. The wider the glass substrate, the wider the isopipe is required. Traditionally, an isopipe is machined from a single, unitary piece of zircon block. Understandably, larger isostatic presses are required to make wider zircon block suitable for larger size isopipes based on a unitary piece of zircon ceramic material. With the machining of the fired zircon block and the shrinkage of the green body during firing taken into consideration, the isopress required can be significantly larger as the isopipe size increases from one generation to the next. The high capital investment for larger isostatic presses could be prohibitive, especially for large size glass substrates, such as those of Gen-10 (2850×3050 mm), Gen-11, G-12 or above. In addition, processing much larger and heavier blocks could pose difficult technical problems, such as a higher potential for crack formation, non-uniformity of grain distribution, lower green and fired density, and lower strength, among other issues that can become more protracted with increasing article size.

Hence there is a need for an effective and efficient process for making large-size zircon ceramic bodies. The present invention satisfies this and other needs.

SUMMARY

According to a first aspect of the present invention, provided is a method for making a zircon block, comprising the following steps:

(i) providing multiple zircon components having surfaces to be bonded;

(ii) applying a bonding material comprising zircon particles to the interface of the surfaces of the multiple zircon components to be bonded;

(iii) contacting the surfaces to be bonded; and (iv) heating the interface to a temperature of at least 1000° C. to effect a bonding at the interface.

In certain embodiments of the first aspect of the present invention, in step (ii), the bonding material further comprises:
titania particles; and
an optional sintering aid.

In certain embodiments of the first aspect of the present invention, in step (ii), the zircon particles in the bonding material have a mean size of less than 2 μm, in certain embodiments less than 1 μm.

In certain embodiments of the first aspect of the present invention, in step (ii), the bonding material further comprises titania particles having a mean size of less than 1 μm.

In certain embodiments of the first aspect of the present invention, in step (ii), the bonding material further comprises titania particles wherein the total percentage by weight of titania is higher than 0.1% of the bonding material.

In certain embodiments of the first aspect of the present invention, in step (ii), the bonding material further comprises titania particles wherein the titania particles are present as a sol.

In certain embodiments of the first aspect of the present invention, in step (ii), the bonding material is a slurry, in certain embodiments an aqueous slurry.

In certain embodiments of the first aspect of the present invention, in step (i), the zircon components have interlocking joints to be bonded.

In certain embodiments of the first aspect of the present invention, in step (ii), the bonding material is pre-applied to a surface of the joints before step (iii).

In certain embodiments of the first aspect of the present invention, at least one of the zircon components to be bonded provided in step (i) has not been treated at a temperature higher than 1500° C.

In certain embodiments of the first aspect of the present invention, at least one of the zircon components to be bonded provided in step (i) has not been treated at a temperature higher than 1000° C.

In certain embodiments of the first aspect of the present invention, in step (iii), the zircon components and the interface undergo an Oswald ripening process.

In certain embodiments of the first aspect of the present invention, in step (iii), the zircon components and the interface are heated to a temperature of at least 1500° C.

In certain embodiments of the first aspect of the present invention, at least one of the zircon components to be bonded provided in step (i) has been pre-sintered at a temperature higher than 1000° C. prior to step (ii).

In certain embodiments of the first aspect of the present invention, at least one of the zircon components to be bonded provided in step (i) has been pre-sintered at a temperature higher than 1400° C. prior to step (ii).

In certain embodiments of the first aspect of the present invention, at least one of the zircon components to be bonded provided in step (i) has been pre-sintered at a temperature higher than 1500° C. prior to step (ii).

In certain embodiments of the first aspect of the present invention, during at least part of step (iii), the zircon components are subjected to a compressive force in the direction perpendicular to the surfaces to be bonded.

In certain embodiments of the first aspect of the present invention, the bonding material is over-filled at the bonding interface.

In certain embodiments of the first aspect of the present invention, the method further comprises the following step (v):

(v) machining the external surface of the block at the bonded location such that the external surface is essentially planar and without a bump or dip.

According to a second aspect of the present invention, provided is a bonding material for bonding zircon blocks, comprising:

(I) zircon particles;
(II) titania particles; and
(III) optional sintering aids such as $SiO_2$, $Y_2O_3$ and $Fe_2O_3$.

In certain embodiments of the bonding material according to the second aspect of the present invention, the zircon particles have a mean size of less than 2 μm, in certain embodiments less than 1 μm.

In certain embodiments of the bonding material according to the second aspect of the present invention, the titania particles have a mean size of less than 1 μm.

In certain embodiments of the bonding material according to the second aspect of the present invention, the total percentage by weight of titania is higher than 0.1%.

In certain embodiments of the bonding material according to the second aspect of the present invention, the titania particles are present as a sol.

In certain embodiments of the bonding material according to the second aspect of the present invention, the titania particles have a mean size of less than 1 μm.

In certain embodiments of the bonding material according to the second aspect of the present invention, the bonding material is a slurry, in certain embodiments an aqueous slurry.

In certain embodiments of the bonding material according to the second aspect of the present invention, the bonding material comprises an organic binder.

In certain embodiments of the bonding material according to the second aspect of the present invention, the bonding material comprises at least one zirconyl salts.

In certain embodiments of the bonding material according to the second aspect of the present invention, the bonding material comprises colloidal titania.

According to a third aspect of the present invention, provided is a method for making a zircon isopipe for a fusion-draw glass manufacturing process, comprising the following steps:

(i) providing multiple zircon components having surfaces to be bonded;
(ii) applying a bonding material comprising zircon, described summarily above in connection with the first aspect of the preset invention and in detail below, to the interface of the surfaces of the multiple zircon components to be bonded;
(iii) obtaining a bonded zircon block by heating the interface to a temperature of at least 1000° C., in certain embodiments at least 1200° C., in certain embodiments at least 1400° C., in certain embodiments at least 1500° C.; and
(iv) machining the bonded zircon block obtained in step (iii) to a desired shape and dimension of an isopipe.

One or more embodiments of the various aspects of the present invention have the following advantages. First, large zircon bodies can be produced without the need of a large, expensive isopressing equipment otherwise required in forming a unitary, large-size green body. Second, the bonding of the multiple components does not contaminate the glass melt to be in contact with the zircon block, due to the composition of the bonding material chosen. Third, the bonded zircon block can be machined to have a planar surface essentially free of a bump or dip in the bonded area, such that a fluid flowing over the surface would not be disturbed to an undesirable degree.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawing is included to provide a further understanding of the invention, and is incorporated in and constitutes a part of this specification.

BRIEF DESCRIPTION OF THE DRAWINGS

In the accompanying drawings.

DESCRIPTION

Figure 1:
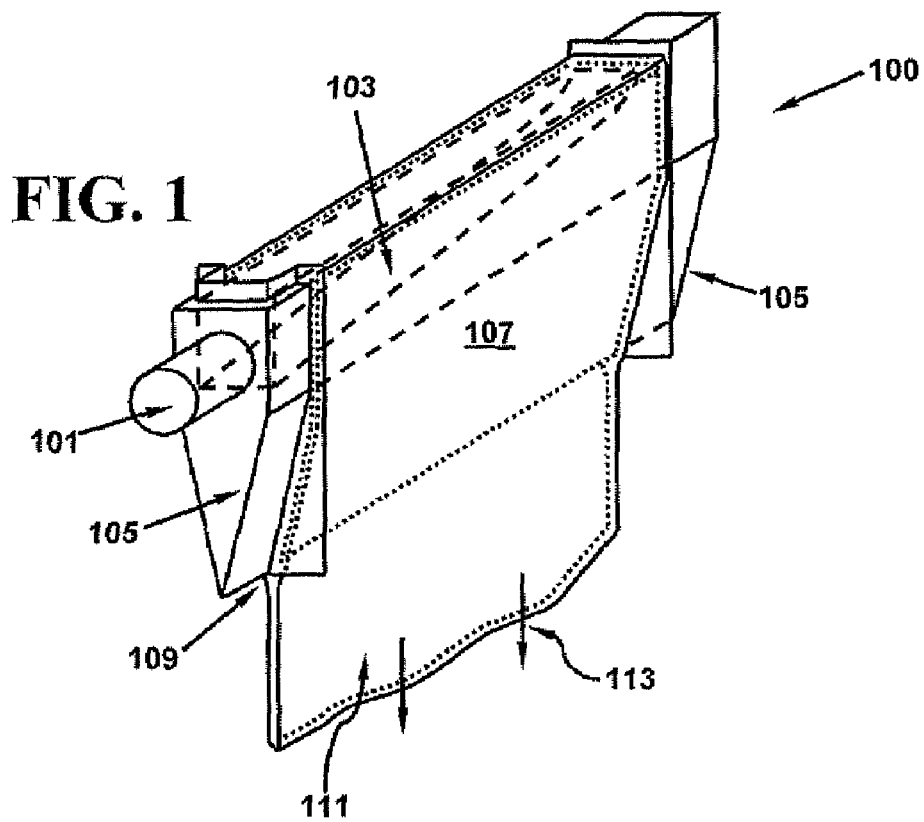
FIG. 1 is schematic drawing showing an isopipe operating to form a glass sheet by the fusion down-draw process.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "a sintering aid" includes embodiments having two or more such sintering aids, unless the context clearly indicates otherwise.

As used herein, a "wt %" or "weight percent" or "percent by weight" of a component, unless specifically stated to the contrary, is based on the total weight of the composition or article in which the component is included. As used herein, all percentages are by weight unless indicated otherwise.

The present invention provides a process for making large zircon blocks suitable for making devices such as isopipes having a large size. The present invention is especially advantageous for making large generation size isopipes such as Gen-10 and above. However, the present invention can be used for making isopipes for smaller generations, such as Gen 8 and below, which can also be made by the traditional unitary-block approach. For example, the present invention makes it possible to recycle part of a defective isopipe in making a larger isopipe. An exemplary recycling process could include the following steps: (a) identifying and severing useful parts from defective isopipes or performs thereof; (b) preparing the useful parts into components to be bonded; (c) bonding the components according to the present invention to form a useful isopipe or a perform thereof.

I. The Zircon Components to be Bonded

The zircon components to be bonded according to certain embodiments of the present invention can be a green body made by isopressing zircon powders and other ingredients. Processes for making such zircon green body is described in, e.g., U.S. Pat. No. 7,259,119, the relevant part thereof is incorporated herein by reference. The green body can contain, in addition to zircon particles, $TiO_2$, and small amounts of one or more of $SiO_2$, $Fe_2O_3$, $Y_2O_3$, other sintering aids and other materials. Typically, the green body has not been fired at a temperature higher than 1000° C.

Alternatively, the zircon components to be bonded according to certain embodiments of the present invention can be a fired green body made by isoppressing zircon powders and other ingredients. The fired zircon block may have been fired at a temperature higher than 1000° C., in certain embodiments higher than 1200° C., in certain other embodiments higher than 1400° C., in certain other embodiments higher than 1500° C., before being bonded according to the present invention.

Zircon blocks having been fired at higher than 1500° C. can have a high density, a high modulus, and a stable dimension and properties under the normal operating condition of an isopipe in the fusion draw process. Fired zircon blocks can be compressed from the ends during the bonding process, as described below.

Figure 2:
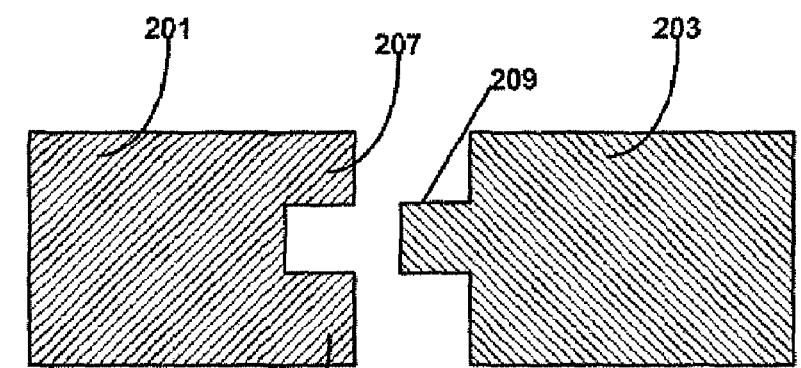
FIG. 2 is a schematic illustration of an embodiment of the process of the present invention for making a bonded zircon block.
Figure 2:
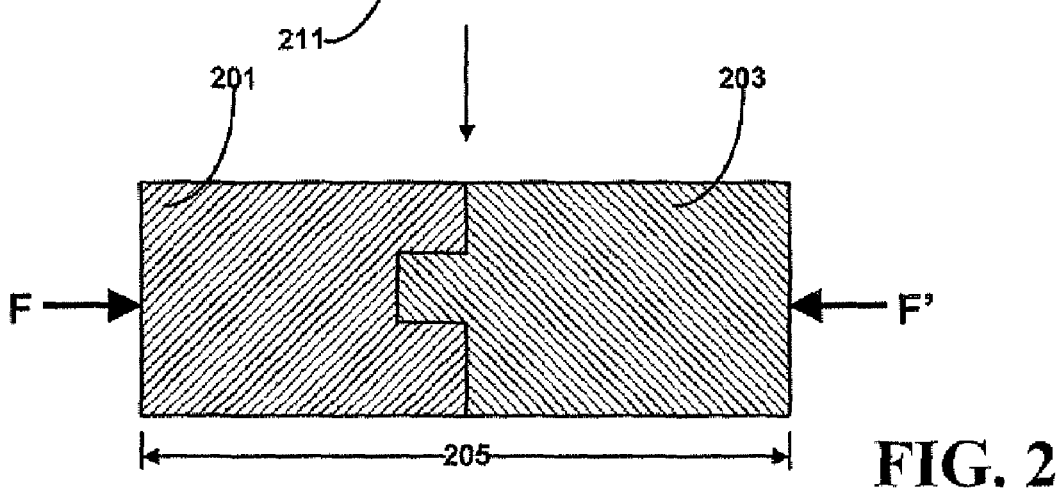

Before bonding, it is desired that the components are machined to have interlocking geometry and/or structure on the interface to be bonded together. FIG. 2 schematically illustrates an interlocking structure of the surfaces of two zircon components to be bonded.

In certain embodiments, it is desired that one component has a smaller size and/or weight than the other. In this embodiment, the final, bonded zircon block may have a higher mechanical strength than a bonded block formed from two components having essentially the same length and/or weight.

It is desired that the surfaces to be bonded of the individual components are precision machined such that a match can be obtained when the components are placed into close contact. A close match of the surfaces to be bonded can avoid the formation of void upon firing, therefore enhance the over strength of the bond.

II. The Bonding Material

The bonding material for use in the present invention comprises zircon particles. In certain embodiments, the zircon particles have a mean particle size of not over 2 μm, in certain other embodiments, the zircon particles have a mean particle size of not over 1 μm. It is believed that smaller zircon particles, such as those having a mean particle size of not over 2 μm, are more active in forming bonds with neighboring zircon grains and with the surfaces to be bonded, thus more effective in forming a long-lasting, strong adhesion between the surfaces to be bonded.

The zircon particles may be formed by various processes, such as mechanical grinding and milling of large zircon blocks, sol-gel processes, and the like, and combinations thereof Zirconyl salts can be advantageously used in the sol-gel process for making synthesized zircon particles.

In addition to zircon particles, the bonding material may further comprise $TiO_2$ particles. The $TiO_2$ particles can be prepared by a sol-gel process from titanium salts and/or organotitanium materials such as $Ti(O\text{-isopropyl})_4$.

In certain embodiments, the bonding material can be prepared by impregnating zircon particles with a solution or a sol of titanium-containing material, such as titanium salts and the like, followed by drying. This can result in titanium-coated zircon particles.

Regardless of the method of making, it is desired that the $TiO_2$-source material is substantially uniformly mixed with the zircon particles, so that distribution of $TiO_2$ in the bonding material is substantially even.

The bonding material can take the form of a dry power, a slurry, a paste, and the like. Slurry and paste are desired in certain embodiments due to their convenience of handling and application to the surfaces to be bonded. The bonding material can contain organic binders, organic solvent, and the like. Desirably, these organic materials are removed prior to the final stage of bonding without leaving detrimental residues.

Furthermore, the bonding material can further comprise a sintering aid that promotes zircon grain growth and bonding, such as through a transient liquidous phase that precipitates and crystallizes upon cooling, as in Oswald ripening or other crystal growth and bonding mechanism. Non-limiting examples of sintering aids include $SiO_2$, $Y_2O_3$, $Fe_2O_3$, and the like. In certain embodiments, it is desired that the bonding material is essentially free of $Fe_2O_3$, especially where the bonded zircon is required to have a high creep resistance under the normal operating condition of an isopipe in the fusion down-draw glass making process.

Prior to bonding, the bonding material is applied to the surface to be bonded of at least one of the zircon components. In certain embodiments, it is applied to the surfaces to be bonded of all components. Such application can be done by, where the bonding material takes the form of a slurry or a paste, brush coating, dip coating, flow coating, spraying, and the like. In certain embodiments, the bonding material is allowed to dry on the surfaces to be bonded upon application before the surfaces to be bonded are placed into close contact and then heated to an elevated temperature.

In certain embodiments, it is desired that the bonding material is overfilled between the surfaces to be bonded. This would allow the interface to be filled substantially completely by the bonding material upon firing, and prevent the formation of a dip at the bonding area on the surface of the bonded zircon block.

III. The Bonding Process

During the bonding step, the particles in the bonding material undergo a sintering process similar to that of an isopressed zircon green body in the traditional process for making a bonded zircon block. Thus, the zircon particles, $TiO_2$ particles and sintering aids adhere to each other to form a dense layer of material. Without intending to be bound by a particular theory, it is believed that the particles undergo an Oswald ripening process in which the crystal grains grow and pack against each other. Further, the zircon particles, titania particles and the optional sintering aid can react with the surfaces to be bonded of the zircon components, forming a strong bond. During the bonding process, the bonding material would typically shrink.

In order to obtain a dense layer of the bonding material between the surfaces to be bonded, it is desired in certain embodiments that the surfaces to be bonded are subjected to a compressive force perpendicular to the surfaces to be bonded. Of course, such compressive force can be a component of a total force applied to the interface. The Compressive force applied allows for the formation of an essentially void-free bonding between the surfaces notwithstanding the shrinkage of the bonding material. Moreover, the compressive force can force part of the bonding material out of the interface between the surfaces to be bonded, resulting in an overall over-filling effect, which can be beneficial in certain embodiments where a dip on the surface of the bonded zircon block is undesirable.

The compressive force can be applied in various ways. In one exemplary embodiment, one proximal end of a first component is placed over an end of a second component during firing, with or without additional force applied to the other, distal end of the first component. In this embodiment, the gravity of the first component provides at least part of the compressive force exerted on the bonding material and the surfaces to be bonded. In another embodiment, a first component is placed into contact with a second component in an end-to-end relation with both being supported horizontally, and external forces F and F' are then applied to their respective ends.

In certain embodiments, it is desired that the components subjected to bonding do not experience significant volumetric change during the bonding process. Significant volumetric change during bonding can result in the cracking of part of the bonded ceramic body. Since a zircon green body that has not been substantially densified can experience significant shrinkage under the bonding condition, it is desired in certain embodiments that the individual components have already been densified and stabilized in terms of volume prior to bonding. Thus, in certain embodiments, it is desired that at least one of the components, in certain embodiments both or all components, to be bonded have been pre-fired at a temperature of at least 1000° C., in certain embodiments at least 1200° C., in certain embodiments at least 1400° C., in certain embodiments at least 1500° C.

IV. Post-Bonding Finishing

The final, bonded zircon block may be subjected to further post-bonding finishing to make the end product. Such post-bonding finishing can include, e.g., surface grinding and polishing, and machining into desired shape and dimension of the end product, such as an isopipe.

As mentioned above, surface finishing around the bonding interface can be particularly useful in eliminating a bump or a dip in the area. For an isopipe, a smooth surface over which the glass melt flows is very important for obtaining a glass sheet with uniform thickness and high surface quality. Without the bonding material filling in the gap between the surfaces to be bonded, a dip can result in the interface, causing irregularity in the glass sheet produced.

FIG. 2 schematically shows an example of two zircon blocks (components 201 and 203) bonded with a mortise and tenon joint (207, 209 and 211). Other joint designs are also envisioned. The joints provide mechanical strength to the final, bonded zircon block. The joint shown in FIG. 2 during bonding are under compressive forces F and F' to help ensure good contact and zircon crystal growth from the bonding material onto the surface of the zircon blocks and zircon crystal growth from the blocks into the joint, achieving a bonding of the two blocks to form a bonded zircon block 205.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A method for making a zircon block, comprising the following steps:
    (i) providing multiple zircon components having surfaces to be bonded;
    (i)(a) providing zircon particles having a mean particle size of less than 2 µm;
    (i)(b) impregnating the zircon particles with a solution of titanium-containing material or a sol of titanium-containing material, followed by drying, to form titanium-coated zircon particles;
    (ii) applying a bonding material comprising the titanium-coated zircon particles to the interface of the surfaces of the multiple zircon components to be bonded;
    (iii) contacting the surfaces to be bonded; and
    (iv) heating the interface to a temperature of at least 1000° C. to effect an bonding at the interface.

2. A method for making a zircon block according to claim 1, wherein in step (ii), the bonding material further comprises:
    a sintering aid.

3. A method for making a zircon block according to claim 1, wherein the bonding material comprises titania and a total percentage by weight of the titania is higher than 0.1%.

4. A method for making a zircon block according to claim 1, wherein the zircon components provided in step (i) have interlocking joints to be bonded.

5. A method for making a zircon block according to claim 1, wherein at least one of the zircon components to be bonded provided in step (i) has not been treated at a temperature higher than 1500° C.

6. A method for making a zircon block according to claim 1, wherein in step (iii), the zircon components and the interface are heated to a temperature of at least 1500° C.

7. A method for making a zircon block according to claim 1, wherein at least one of the zircon components to be bonded provided in step (i) has been pre-sintered at a temperature higher than 1000° C. prior to step (ii).

8. A method for making a zircon block according to claim 1, wherein during at least part of step (iii), the zircon components are subjected to a compressive force in the direction perpendicular to the surfaces to be bonded.

9. A method for making a zircon block according to claim 1, wherein the bonding material is over-filled at the bonding interface.

10. A method for making a zircon block according to claim 1, further comprising the following step (v):
    (v) machining the external surface of the block at the bonded location such that the external surface is essentially flat and without a bump or dip.

11. A method for making a zircon isopipe for a fusion-draw glass manufacturing process, comprising the following steps:
    (i) providing multiple zircon components having surfaces to be bonded;
    (i)(a) providing zircon particles having a mean particle size of less than 2 µm;
    (i)(b) impregnating the zircon particles with a solution of titanium-containing material or a sol of titanium-containing material, followed by drying, to form titanium-coated zircon particles;
    (ii) applying a bonding material comprising the titanium-coated zircon particles to the interface of the surfaces of the multiple zircon components to be bonded;
    (iii) obtaining a bonded zircon block by heating the interface to a temperature of at least 1000° C.; and
    (iv) machining the bonded zircon block obtained in step (iii) to a desired shape and dimension of an isopipe.

* * * * *